Sept. 20, 1932.  C. C. JACOBSON ET AL  1,877,880
DIE BLOCK
Filed June 26, 1931    2 Sheets-Sheet 2
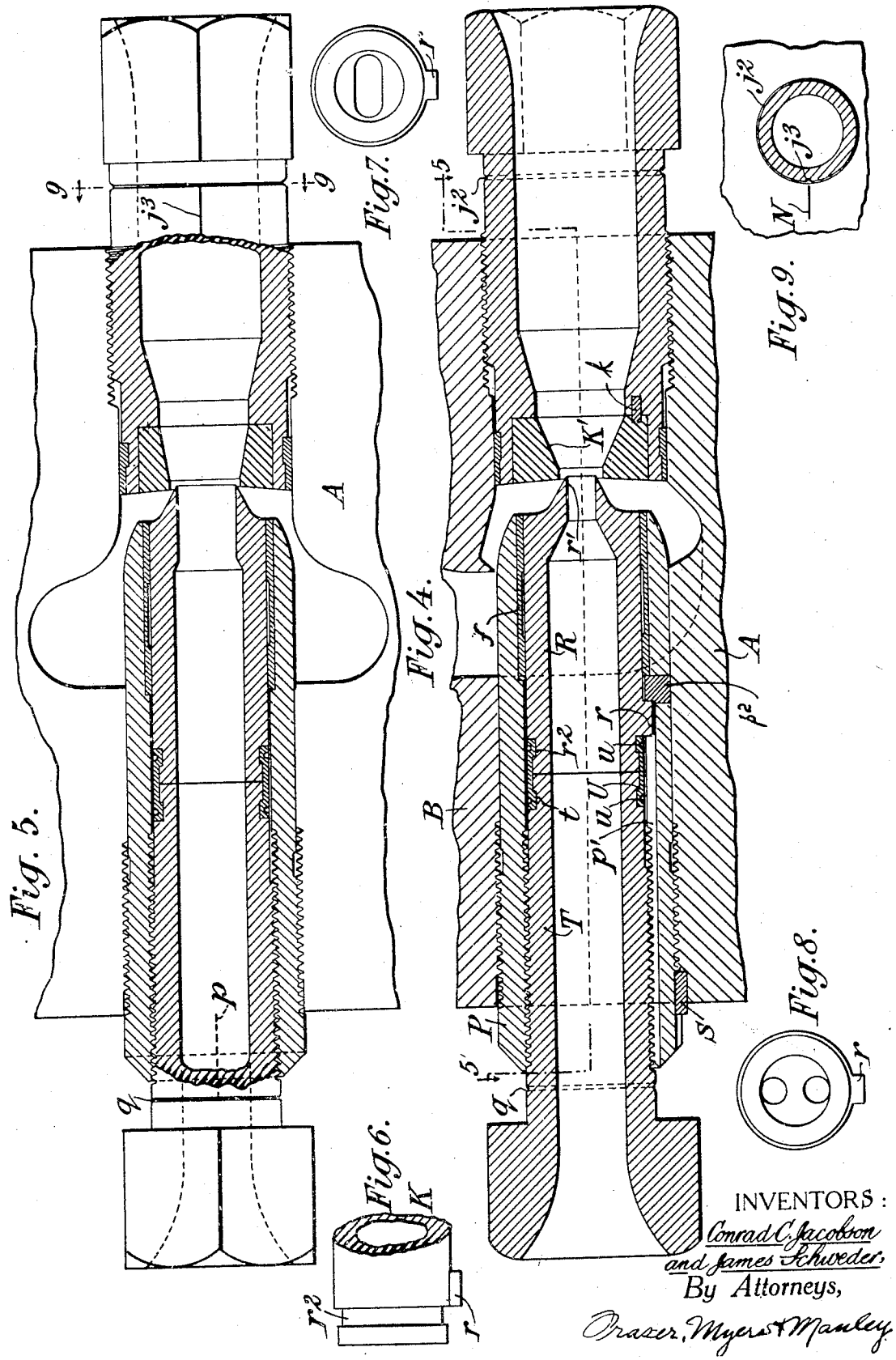
INVENTORS:
Conrad C. Jacobson
and James Schweder,
By Attorneys,
Frazer, Myers & Manley Patented Sept. 20, 1932

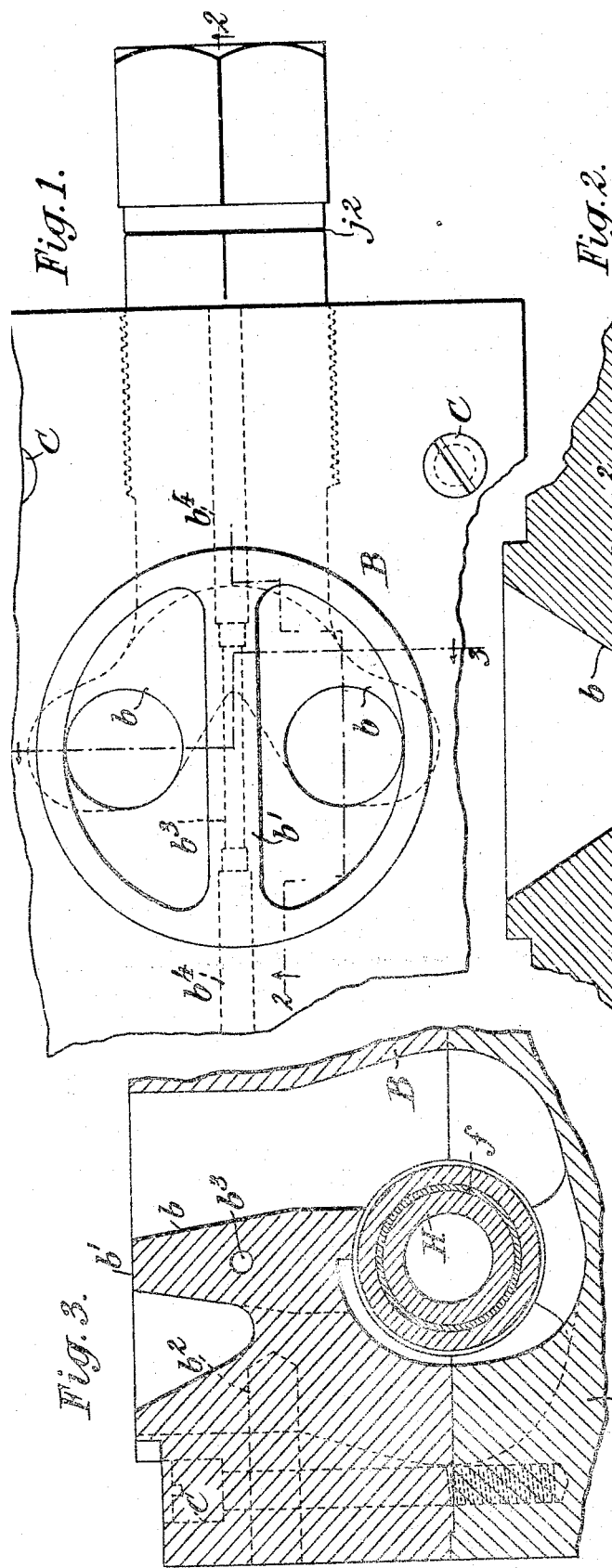

1,877,880

UNITED STATES PATENT OFFICE

CONRAD C. JACOBSON, OF GLEN RIDGE, NEW JERSEY, AND JAMES SCHWEDER, OF BROOKLYN, NEW YORK, ASSIGNORS TO JOHN ROBERTSON CO., INC., OF BROOKLYN, NEW YORK, A CORPORATION OF NEW YORK

DIE BLOCK

Application filed June 26, 1931. Serial No. 547,046.

The present invention relates to die blocks and aims to provide certain improvements therein. More particularly, it relates to die blocks through which metal is extruded in the process of coating cables, wire and the like.

An object of our present invention is to provide a die block and its constituent parts of such construction that the core tip and the die may be positioned within and removed from the die block without scoring or cutting the parts in which they are held. A further object is to provide means for accurately gauging and indicating the position of the core and the die in relation to each other within the die block. A still further object is to provide novel means of holding and moving the core tip and core nut as a unit for facilitating their placement in, and removal from, the die block.

The foregoing and other objects of the invention, which will be apparent from the detailed description which follows, we accomplish by the novel construction of die blocks illustrated in the accompanying drawings, wherein Figure 1 is a fractional top plan view of a die block embodying our invention.

Fig. 2 is a longitudinal section taken substantially along the planes of the broken line 2—2 of Fig. 1.

Fig. 3 is a section taken substantially along the planes of the broken line 3—3 of Fig. 2.

Fig 4 is a longitudinal section substantially similar to Fig 2, showing a slight modification of our invention.

Fig. 5 is a section taken substantially along the planes of the broken line 5—5 of Fig. 4.

Fig 6 is a side elevation of the rear end of the core tip shown in Figs. 4 and 5.

Fig. 7 is a front end elevation of the core tip shown in Figs. 4 and 5.

Fig. 8 is a front elevation of a slightly modified form of core tip.

Fig. 9 is a section taken along the plane of the line 9—9 of Fig. 5.

Referring first to Figs. 1 to 3 of the drawings, our improved die block construction consists of a die block casing which is preferably formed in two parts, namely, a lower section A and an upper section B, said sections being constructed for accurate mating at their meeting surfaces and being held securely together through the medium of a plurality of bolts C. Preferably the mating surfaces of the upper and lower sections are complementally grooved to provide a bore through the assembled die block. The bore thus provided is screw-threaded for part of its length, as shown at D, at the left hand end of the die block, and screw-threaded for part of its length, as indicated at E, at the right hand end. Within the screw-threaded end D is removably mounted a master core F, within which is adjustably positioned a core nut G and a core tip H. Adjustably mounted within the screw-threaded bore E is a die nut J which carries a die K held within the die nut by steel dowel pins $k$ (Fig. 4). The core tip H and the die K are adjustably positioned and held in definite cooperative relation within an extruding chamber L formed partly in the lower die block section A and partly in the upper section B, the upper portion of the chamber communicating with two funnel-like openings $b, b$ formed in the upper section B, and separated from each other by a bridge $b'$. The shape of the chamber L is such as to permit substantially uniform pressure being applied to the extruding metal around the extruding orifice M between the core tip H and the die K.

For preventing scoring and cutting of the outer surface of the core tip H while it is being inserted into and removed from the master core F, the inner end of the bore through the master core is fitted with a bushing $f$, the inner diameter of which closely fits the outer diameter of the core tip. The bushing $f$ may be formed of any suitable non-ferrous alloy, for example, bronze, Monel metal, or the like. For facilitating the positioning in, and removal from, the master core of the core tip H, the core nut G is suitably connected therewith so that both the core nut and the core tip are adapted to move axially as a unit. As shown in Fig. 2, this connection, which is a detachable one, consists of a T-shaped projection $g$ provided at diametrically opposite points on the inner end of the core nut G, which projections are fitted within T-shaped grooves $h$ formed in the adjacent end of the core tip. Longitudinal movement of the core tip and core nut within the master core is provided through the medium of the internal screw threads $f'$ of the master core and the external screw threads $g'$ of the core nut. The outer end of the core nut is appropriately formed with wrench-engaging surfaces (not shown) similar to those on the outer end of the die nut, and indicated by the reference character $j$.

The die K, which is suitably held within the die nut J, is adjustably positioned within the die block through the medium of the screw-threaded connection between the die nut and the threads E by rotating said die nut through the wrench-engaging surfaces $j$ thereon. For preventing scoring and cutting of the seat of the die block within which the end of the die nut fits, said end of the die nut is provided with a bushing $j'$ which is preferably formed of a non-ferrous alloy, such as Monel metal, bronze, or the like.

For accurately gauging and indicating the position of the core tip and the die in relation to each other within the extruding chamber of the die block, the core nut and the die nut are each provided with a gauge line, one such gauge line being shown and indicated by the reference character $j^2$ in proximity to the wrench-engaging end of the die nut.

In the use of a die block such as above described it is important that the temperature of the die block be controlled, and as an aid in accomplishing this, the die block is provided with holes $b^2$ for accommodating thermo-couples, and a hole $b^3$ is provided through the bridge $b'$ through which cooling water may pass. Suitable connection with said hole $b^3$ is provided by the communicating ducts $b^4$ in the upper section B on opposite sides of said bridge.

In Figs. 4 to 7 of the drawings we have shown a modified construction of master core, core nut and core tip particularly adapted for extruding a covering for duplex cable, in the operation of which it is absolutely essential that the cooperative angular relation between the tip of the core tip and the opening in the die, which are non-circular in form, be accurately maintained. To accomplish this, cooperating gauge lines are located on the upper section B of the gauge block, and on the die nut and the master core. The gauge lines on the die block are arranged on the vertical end walls thereof and are preferably located in a common vertical plane. One such gauge line is indicated by the reference character N in Fig. 9 of the drawings. Cooperating with these gauge lines are the gauge line $j^3$ on the die nut, and the gauge line $p$ on the master core P. Gauge lines on the master core and core nut for enabling the operator to gauge the relative position of the core tip and the die in axial relation to one another inside of the extruding chamber are indicated by the reference characters $q$ on the core nut and $j^2$ on the die nut.

As aforementioned, it is essential that the core tip shall have a definite angular relation to the opening in the die, and to insure a fixed definite position which the core tip will always assume, we have provided the novel construction of master core, core nut and core tip disclosed in Figs. 4 to 8. In this construction the master core, which has been indicated by the reference character P, differs from the master core shown in Fig. 2, in that it is provided with an internal key-way $p'$ for accommodating a key $r$ integrally formed with core tip R near the rear end thereof. It will thus be seen that the core tip R must always assume a definite angular relation with respect to the master core P, and in view of the fact that the extruding end $r'$, which is of elongate cross-section, must always assume a definite angular relation with the die K', which is of similar elongate section, it will be apparent that the master core P must be locked in definite angular relation to said die K'. The definite position for the master core must be ascertained by test, and when determined, the master core must be locked to the die block by suitable means. One such means we have shown as a key S engaging in complemental key-ways in the lower die block section A and master core P.

Once the die block has been assembled with the parts in definite relationship to one another and it is desired to vary the thickness of the extruded lead covering, the core tip R has to be moved backward or forward with relation to die K', the key $r$ riding in the keyway $p'$ serving to maintain the axial alignment of the parts. To prevent the core tip R in its backward movement from dislodging the bushing $f$ we provide in the master core P a stop key $p^2$.

For axially moving the core tip into and out of the master core without rotative movement with respect thereto, the core tip is swivelly coupled with the core nut T. This swiveled connection is provided by forming the adjacent ends of the core tip R and core nut T with ends of reduced diameter, inwardly of which they are formed with annular grooves $r^2$ and $t$, respectively. A split ring U of appropriate cross-section engages in the annular grooves $r^2$ and $t$ to hold said members together. The split ring U may be formed of any suitable metal, such as bronze, and to further insure its retention in position, it may be wired in place through the medium of suitable wires positioned in the annular grooves $u$.

The means for preventing cutting and scoring of the various parts of the die block embodied in the form of invention shown in Figs. 4 to 9 are substantially the same as those described with respect to Figs. 1 to 3, and are therefore not repeated in detail.

In Fig. 8 we have shown in elevation a core nut suitable for simultaneously extruding coverings for two separate cables. Obviously by suitably modifying the openings in the end of the core tip and the die, the die block may be adapted for extruding one or more coverings for cables, either separately or together, with any required exterior cross-sectional contour.

From the foregoing detailed description it will be apparent that we have devised novel means for accomplishing the objects of our invention as set forth in the opening statement of this specification, and although we have shown and described certain preferred embodiments of our construction, it is to be understood that we do not wish to be limited to these specifically, since they may be modified without departing from the spirit of the invention.

What we claim is:

1. A die block of the character described, having a core and a die, at least one of said parts being transversely divided, and means for detachably holding said divided parts against relative axial movement, but permitting relative rotational movement therebetween.

2. A die block of the character described, having a transversely divided core consisting of a core tip and a core nut, and means for detachably holding said core parts together so as to be movable into and out of the core as a unit.

3. A die block of the character described, having a transversely divided core consisting of a core tip and a core nut, the adjacent ends of said parts being in abutting relation, and means engaging said adjacent ends for holding them against relative axial movement but permitting relative rotational movement therebetween.

4. A die block having a core and a die, means for placing and removing said parts from the die block, and non-ferrous bushings on said means for allowing the sliding of said parts into place without scoring or cutting.

5. A die block having a die, a die nut carrying said die, and a non-ferrous bushing on said die nut for engaging the seat of the die block.

6. A die block having a master core, a non-ferrous bushing within the end of said master core, and a core tip within the master core in engagement with the bushing therein.

7. A die block having a separable core, and means for preventing rotation of the core with respect to the die block.

8. A die block having a core provided with a key, and a part having a key-way, said core being adapted to slide and be positioned within said part.

9. A die block having a threaded bore, a master core adjustably positioned within said bore, and a separate core tip adjustably and removably mounted within said master core from the exterior thereof.

In witness whereof we have hereunto signed our names.

CONRAD C. JACOBSON.
JAMES SCHWEDER.

CERTIFICATE OF CORRECTION.

Patent No. 1,877,880.  September 20, 1932.

CONRAD C. JACOBSON ET AL.

It is hereby certified that error appears in the printed specification of the above numbered patent requiring correction as follows: Page 3, after line 70, insert the following claim as claim 10:-

10. A die block having a threaded bore, a master core adjustably positioned within said bore, a separate core tip removably mounted within said master core, and means for fixedly holding the master core in positon within the die block.;

and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.